May 21, 1940.  H. J. LENTZ  2,201,907
VALVE GEAR FOR REVERSIBLE RECIPROCATING FLUID PRESSURE
ENGINES, ESPECIALLY FOR LOCOMOTIVES
Filed Feb. 23, 1938    4 Sheets-Sheet 2

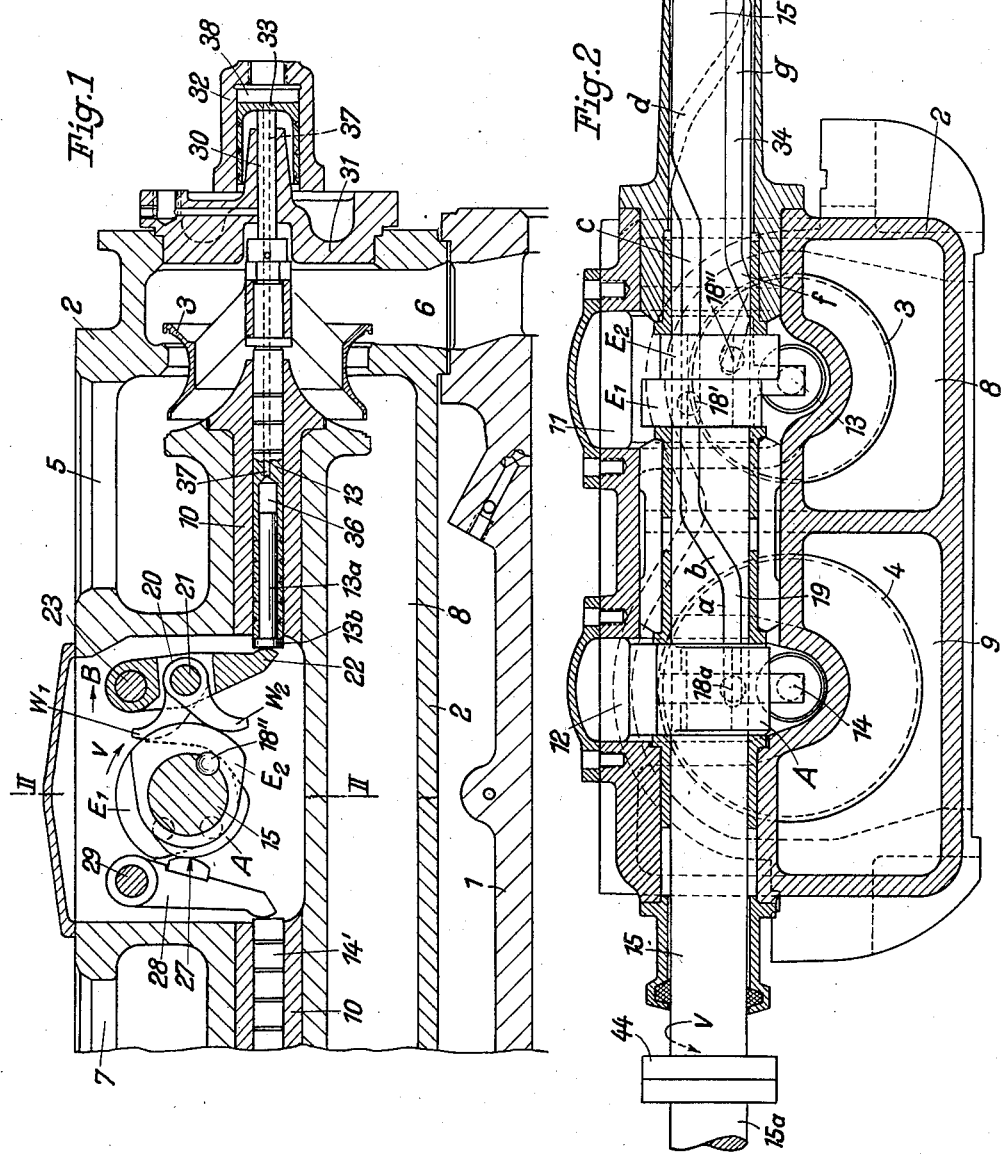

Inventor:
H. J. Lentz
by Bryan & Lowry
Attys.

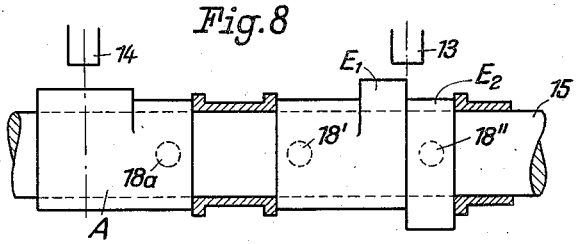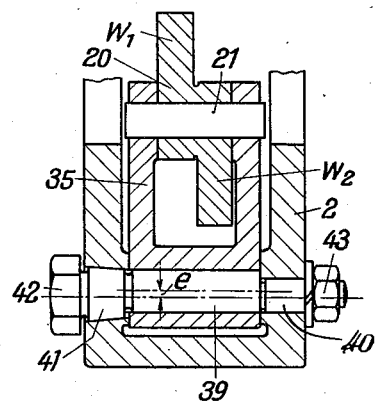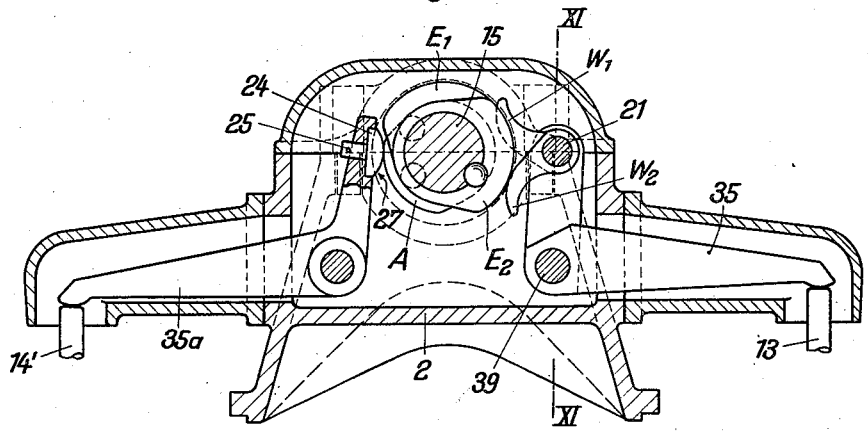

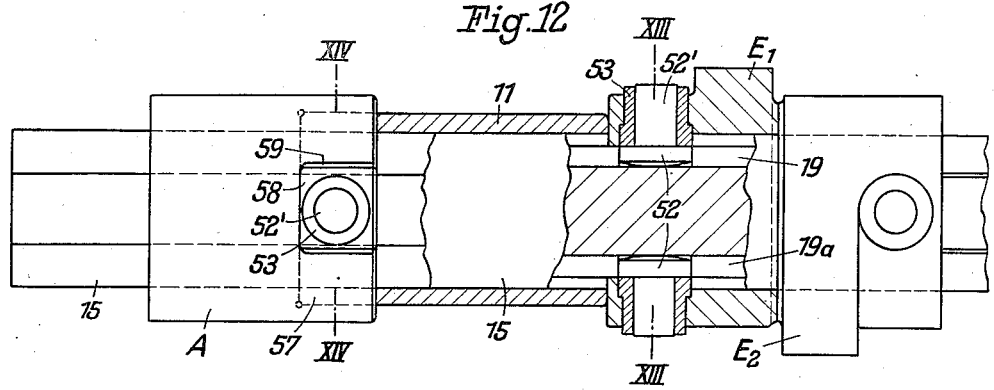
Fig. 12
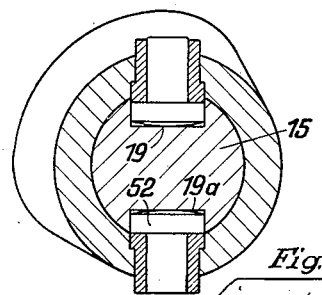
Fig. 13
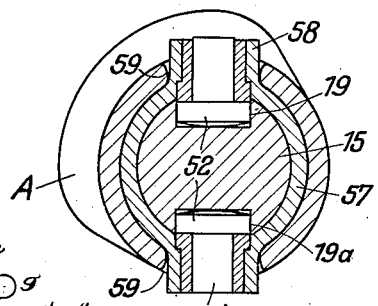
Fig. 14
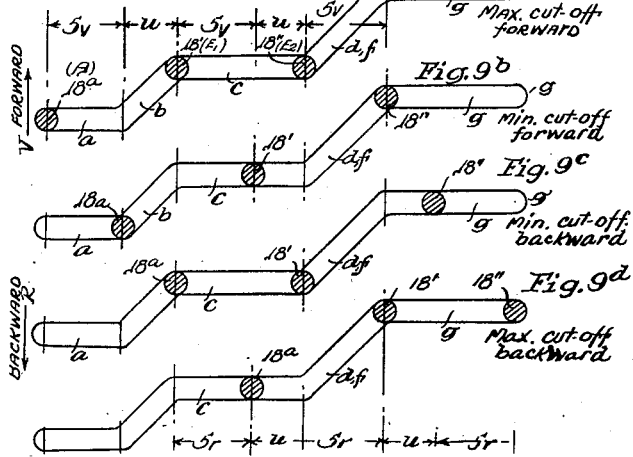

Patented May 21, 1940

2,201,907

UNITED STATES PATENT OFFICE 2,201,907

VALVE GEAR FOR REVERSIBLE RECIPROCATING FLUID PRESSURE ENGINES, ESPECIALLY FOR LOCOMOTIVES

Hugo Johannes Lentz, Vienna, Austria

Application February 23, 1938, Serial No. 192,121
In Great Britain August 7, 1937

4 Claims. (Cl. 121—127)

This invention relates to a valve gear for reversible reciprocating fluid pressure engines, especially for locomotives in which the valves are actuated by rotating cams, especially in which for controlling the steam admission two relatively adjustable cams are used of which, in one direction of rotation, one cam determines the beginning of the admission lead and the other the end of the cut-off, whereas in the other direction of rotation the functions of the cams are reversed. The steam exhaust from the cylinder is mostly controlled by an exhaust cam which at the reversal is swung through a corresponding angle range and which determines both the beginning of the exhaust lead and also the beginning of the compression.

The known gears of this type are all open to the objection that the control points which determine the beginning of the admission lead and the beginning of the compression are interdependent through the gear drive and consequently cannot be independently adjusted to assume the most favourable position for the steam distribution and steam utilization at the cut-off actually adjusted. This is not attained by the gears hitherto known, because all the cams are adjusted through an angle corresponding to the change of cut-off or not at all by the reversal or the gear drive.

The present invention is based on the idea of arranging the cam shaft shiftable relatively to all the cams and to adjust each cam separately by control grooves in the periphery of the cam shaft and catches engaging in and guided by these grooves, so that, corresponding to the different pitches of the control grooves the individual cams are adjusted through different angles which are independent of one another. It is therefore possible to make the grooves or groove sections controlling the individual cams of a shape and pitch which ensure the most favourable position of the control points and therefore the best steam utilization for the type of engine in question.

The control grooves may be arranged with different pitches in helical shape on the periphery of the cam shaft; but, if necessary, parts of the grooves may extend axially if an adjustment of the cams is not to take place.

This construction of the gear enables accurate adaptation to the service conditions, in using an extremely simple mechanical control drive.

The invention also relates to a special construction of the intermediate members cooperating with the control cams and acting on the control valves, which members may be made of any width and consequently also operate with line contact and whose chief features are disclosed by the two forms of construction hereinafter described with reference to the accompanying drawings in which Fig. 1 shows a portion of the control chest in longitudinal section, taken at the right of the control shaft in the direction of the spindle of the admission valve and at the left of the control shaft in the direction of the exhaust valve spindle.

Fig. 2 shows a cross section on line II—II of Fig. 1.

Fig. 8 shows a second form of construction of the control cams which are arranged on the cam shaft so that this shaft need have only one single continuous control groove.

Figs. 9a to 9d show the control grooves according to the cam arrangement of Fig. 8 developed to a plane in the different positions for maximum and minimum cut-off forward and backward.

Fig. 10 is a longitudinal section through a control chest for valves arranged hanging in the cylinder.

Fig. 11 is a section on line XI—XI of Fig. 10 on larger scale, however with the difference, that the journal for the axle of oscillation of the intermediate lever is eccentrically arranged relative to the axle.

Fig. 12 shows in side elevation a portion of the cam shaft (partly in section) with two cam grooves situated diametrically the one to the other and two other forms of construction of the coupling elements.

Figure 3:
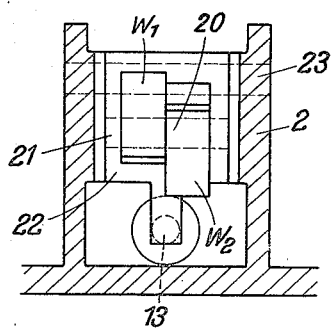
Fig. 3 shows in elevation the intermediate lever arranged between admission control cam and admission valve spindle viewed in the direction of the arrow B of Fig. 1.

Fig. 13 being a cross-section on line XIII—XIII of Fig. 12 and

Fig. 14 a cross section on line XIV—XIV of Fig. 12.

On the cylinder 1 a control chest 2 is mounted in which the steam channels for the admission and discharging of the steam and the control valves are accommodated. The cam shaft 15 with the admission and exhaust control cams mounted thereon is arranged in the middle of the control chest and transversely to the same. On each side of the cam shaft an admission valve 3 and an exhaust valve 4 are arranged in the control chest, the spindles 13 or 14 of said valves being parallel to one another and directed towards the cam shaft. In Fig. 1 a section in the direction of the spindle of the admission valve is shown at the right of the cam shaft and at the left of the same a section in the direction of the exhaust valve spindle. The left half of the control chest is only partly shown, as it is constructed like the right hand half.

The live steam is admitted to the inlet 5, from which, as shown, the right admission valve 3 being open, it passes through the right channel 6 into the cylinder. The steam expended on the other piston side leaves the cylinder through a corresponding left passage 6 and is discharged through the outlet 7, the left exhaust valve 4 being opened.

In order to conduct the live steam from the inlet 5 also to the left piston side, a longitudinal channel 8 is provided in the control chest, extends to the left admission valve 3 and communicates with the left passage 6, when the admission valve 3 is open.

In similar manner the outflowing steam flows, when the right exhaust valve 4 is opened, from the front piston side to the outlet 7 through a second longitudinal channel 9.

The longitudinal channels 8 and 9 may be omitted, in which case at each end of the control chest an inlet 5 and an outlet 7 are arranged.

The spindles of the distribution valves, constructed as double seat valves, are mounted in insert bushes 10 which are pressed into bores of the control chest 2. The spindles have labyrinth-grooves effecting the packing of the spindles towards the cam chambers. In the control chest two cam chambers 11 and 12 are provided in the form of construction illustrated, closed at the top by caps or covers. The ends of the admission valve spindles 13 extend into chamber 11, whereas the ends of the exhaust valve spindles 14 extend into the other chamber 12.

The control of the valves is effected from a shaft 15 journalled in the control chest 2 transversely to the cylinder 1 and driven in a suitable manner from a movable element of the locomotive.

For controlling the admission valves 3, two cams E₁ and E₂ are mounted on the cam shaft 15 and can be mutually displaced by members mounted on the cams, for instance balls 18' and 18" placed in cavities of the cams which engage in grooves 19 of the cam shaft 15, so that the cams are moved into an adjusted position by a transverse movement of the rotating cam shaft 15.

A cradle 20, which is suspended at 21 on an intermediate lever 22, bears against the cylindrical circumference of the control cams E₁ and E₂. The intermediate lever 22 is oscillatably mounted in the control chest 2 on an axle 23, its free end bearing against the end of the admission valve spindle 13. A similar arrangement for the valve spindle is provided on the other side of the cam.

The cradle 20 is formed by two arms which are situated in different planes and curved in opposite directions so that the arm W₁ tangentially contacts on its entire width with the periphery of the cam E₁ and the other arm W₂ with the periphery of the cam E₂.

For the control of the exhaust valves 4, the exhaust cam A is loosely mounted on the cam shaft 15 and is coupled with this shaft in a similar manner by an element (ball) 18a engaging into the groove 19. A domed control face 27 of an intermediate lever 28 bears against the circumference of this cam, said intermediate lever being oscillatably mounted about an axle 29 in the control chest, the free end of said intermediate lever acting upon the spindle 14 of the exhaust valve. On the right hand side of cam shaft 15 a similar intermediate lever is arranged for controlling the exhaust valve spindle 14.

Steam or air under pressure serves for closing the valves. With this object in view plungers 30 are mounted on the valves and adapted to pass through a bore of the actual valve chest cover 31. Cylinders 32 are fixed on these covers and pistons 33, shiftably mounted in these cylinders, bear against the plungers 30.

Every cylinder is connected with the steam boiler or with a container for air under pressure by a pressure conduit not shown, so that the fluid under pressure can act upon the piston 33, when the conduit is opened, and moves the valves into the closing position.

This fluid under pressure serves at the same time to maintain the contact of the control elements for the admission valves during the expansion period. With this object in view a bolt 13a is inserted into a bore 36 of the admission spindles 13, the head 13b of this bolt bearing against the end of the admission spindle 13 and the other side of the bolt head 13b bearing against the end of the intermediate lever 22. The space behind bolt 13a communicates through a bore 37 in the spindle 13 of the admission valve and in the plunger 30 with the pressure space 38 behind the piston 33. The pressure fluid introduced into space 38 can therefore permanently act upon the bolt 13a which, owing to the pressure exerted upon it, maintains the control elements 22, 20 in engagement with the cams.

For regulating the cut-off of the engine and also for reversing, the cam shaft 15 is mounted shiftable in axial direction, the adjusting of the admission- and exhaust-cams being effected by control grooves in the cam shaft which extend in accordance with the desired positions of the cam elements axially, partly helically as will be hereinafter explained.

In Figs. 1 to 7 it is supposed, that the cams are adjusted for maximum cut-off for forward running and that the cam shaft rotates in the direction of the arrow V and that further the piston is standing in the front end of its travel. During one and the same direction of travel the exhaust lead and the compression are not altered in the arrangement shown. The exhaust cam A, which controls the exhaust valves must therefore not turn relative to the cam shaft 15 during alteration of the cut-off. The part $a$ of the groove 19 must therefore extend in the axial direction. If the direction of rotation is changed, the exhaust cam A must be adjusted from the medium position by the same angle in opposition for the new direction of movement. The part $c$ of the control groove 19 for backward running must therefore be displaced from the dead point line $x-x$ by the same angle as part $a$ of groove 19. To enable the transition from forward to backward running, a helical transition groove $b$ is provided, the length of which, measured in axial direction, corresponds to the reversing distance $u$.

The admission cams E₁ and E₂ for controlling the admission valves are of such shape and positioned in such a manner, that, if the one arm of the cradle 20 rests upon the base circle of the one cam, the other arm freely runs up on the second cam and lifts the intermediate lever 22 so far, that its end just touches the admission valve spindle, when the valve is closed, it being immaterial in which direction the cam shaft 15 rotates.

Figure 5:
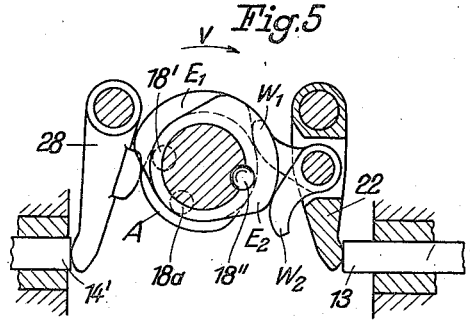
Figs. 5 to 7 show each a different position of the control cams.
Figure 4:
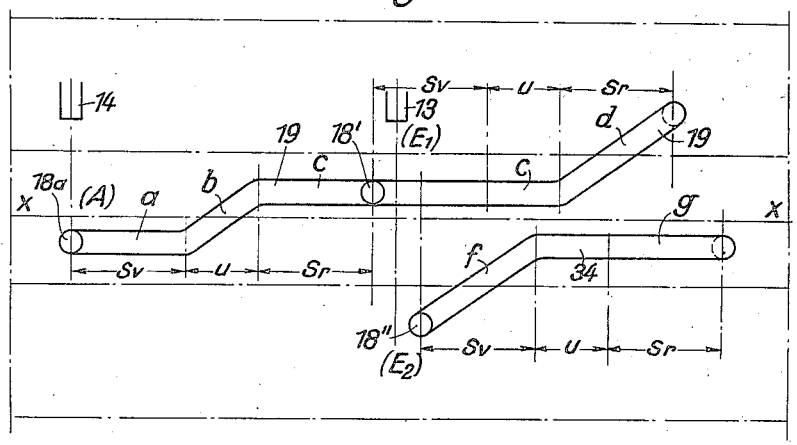
Fig. 4 shows a portion of the circumference of the cam shaft of the control grooves, developed to a plane.
Figure 6:
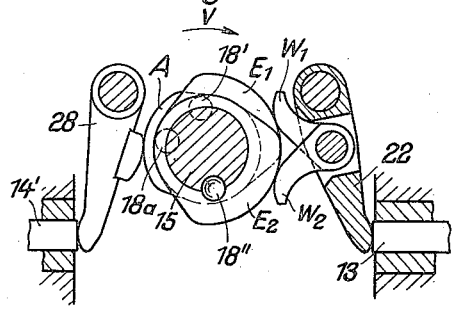
Figure 7:
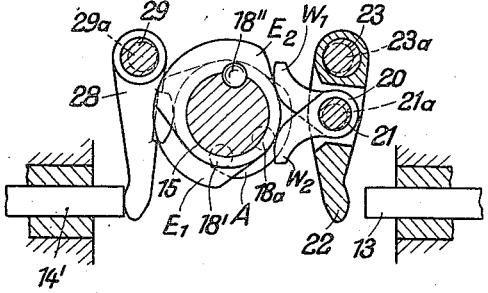

Fig. 5 shows the position of the control cams, in which the admission cams $E_1$ and $E_2$ are adjusted to maximum cut-off for forward running. The cam $E_2$ has lifted the arm $W_2$ of the cradle so far, that the end of the intermediate lever 22 just touches the spindle 13 of the admission valve 3. If the rotation of the cam shaft continues, the cam $E_1$ begins to lift the arm $W_1$ of the cradle whereby through the intermediate lever 22 the valve is lifted. This controlling edge of cam $E_1$ determines therefor the admission lead. During further turning of the cam shaft the arms $W_1$ and $W_2$ of the cradle rest upon the corresponding extreme circumferences of the cams $E_1$ and $E_2$ which are concentrical to the axis (Fig. 6) whereby the admission valve 3 fully opens. If then the arm $W_2$ of the cradle runs off the cam $E_2$, the admission valve closes (Fig. 7). This running-off surface determines therefor the cut-off point. By adjusting of cam $E_2$ the cut-off can be altered. The adjusting of the cam $E_2$ is effected by a control groove 34 which at the beginning has a helical branch $f$ which determines different cut-offs according to the position of the cam shaft. During this adjusting the cam $E_1$ is controlled by the axial groove $c$, i. e. remains uninfluenced.

During the reversing of the direction of rotation of cam $E_2$, which now determines the lead, must be maintained in its relative position to the cam shaft 15, whereas the cam $E_1$ must be adjustable relative to the cam $E_2$ for the purpose of regulating the cut-off. With this object in view, an axially directed branch $g$ extends from the helical branch $f$ of groove 34, whereas the cam $E_1$ is adjusted by the helical part $d$ of groove 19. This curve-part $d$ extends from the axial curve part $c$ which, during forward running, securely holds the admission cams and during backward running the exhaust cam A.

During a shifting of the cam shaft 15 by the distance $s_v$ the control of the cut-off for forward running is effected, during the then following shifting by the distance $u$ to the opposite direction of rotation and by further shifting by the distance $s_r$ the control of the cut-off for backward running is effected.

In the form of construction described above a separate control groove 34 is provided for controlling the cam $E_2$. This control groove 34 may, however, form a direct continuation of groove 19 if the control cam is accordingly constructed and if the coupling elements are accordingly arranged, as is shown in Figs. 8 and 9. The portion $d$ of the groove 19 coincides then with the portion $f$ of groove 34.

During running forward and adjusted maximum cut-off the coupling element 18a for the exhaust cam A is at the beginning of groove $a$, the coupling element 18' for the cam $E_1$ is at the beginning of groove $c$ and the coupling element 18'' for the cam $E_2$ is at the end of groove $c$. During the shifting of the cam shaft to the left by the distance $s_v$ the cams A and $E_1$ remain in their position, whereas the cam $E_2$ is adjusted. During further shifting of the cam shaft by the distance $u$ the reversing of the exhaust cam A to running backward is effected by the groove $b$. The coupling element 18a is then at the beginning of the groove $c$, the coupling element 18' at the beginning of groove $d$, and the coupling element 18'' at a distance $u$ from the beginning of the groove $g$. At further adjusting of the cam shaft by the distance $s_r$ the exhaust cam A and the admission cam $E_2$ remain in the adjusted position, whereas the cam $E_1$ is adjusted by the groove $d$ and gives different cut-offs. Figs. 9a–9d show the different positions of the coupling elements for maximum and minimum cut-off forward and backward.

The same kind of distribution may be employed also with such steam engines, in which the valves are arranged hanging in the cylinder. Fig. 10 shows such an arrangement in section. In this instance two-armed bell crank levers 35 or 35a are substituted for the intermediate levers 22 or 28, the ends of the horizontal arms of these levers 35, 35a acting upon the valve spindles.

In the forms of construction hereinbefore described the control grooves $a$ and $c$ extend in axial direction. The exhaust cam A therefore preserves its position during the adjusting of the cam shaft 15 and at the different cut-offs. The control points for the exhaust lead and for the beginning of the compression are therefore lying always at the same point.

To make these control points changeable and to adapt them to the different cut-offs, it is necessary to make the control grooves $a$ and $c$ deviate more or less from the axial directions as shown in Fig. 9e by the grooves $a'$ and $c'$. In this manner, the compression can begin sooner and the exhaust lead later with larger cut-offs, that is lower running and lower counter-pressure.

The adaptation of the control points for the different cut-offs may further be effected thereby, that the domed running-on face 27 for the exhaust cam A is arranged on an exchangeable shoe 24 which, by means of a pin 25, is mounted in the intermediate lever 28 or 35a (see Fig. 10). Then it is merely necessary to insert according to the desired displacement of the control points a control shoe of other shape.

The position of the control points may further be altered as the pivot axles of the intermediate levers are made adjustable. A form of construction is shown by way of example in Fig. 11, which is a section on line XI—XI of Fig. 10 on larger scale, showing an altered mounting of the bell crank lever 35. In this distance the pivot axle 39 of this bell crank lever has pins 40 and 41 displaced eccentrically to the axle by the distance $e$, the pin 41 being cone-shaped and carrying a nut 42 for adjusting the pin 39, whereas the nut 43 serves for tightening the adjusted pin 39. The cradle 20 with the arms $W_1$ and $W_2$ is mounted on the upwardly directed arm of the bell crank lever 35 on a pivot pin 21.

A similar arrangement may also, as indicated in Fig. 7, be provided for the pivot axle of the intermediate levers 22 and 28. The axle 23 for the intermediate lever carries an eccentric pin 23a, by means of which the pivot axle can be adjusted higher or lower for altering the exhaust lead. During this adjusting also the cut-off alters in a little measure. To obtain the same cut-off as before it is merely necessary to make also the pivot axle of cradle 20 adjustable about a pin 21a situated eccentric to it.

In Fig. 7 the same adjusting is indicated also for the exhaust intermediate lever 28 in that the pivot axle 29 is equipped with an eccentrically arranged pin 29a. By the adjusting of the exhaust intermediate lever the beginning of the compression can then also be adjusted.

In order that during the axial shifting of the groove shaft no forces acting on one side occur and an easy guiding of the coupling elements in the control grooves is enabled, similar control grooves 19 and 19a are arranged in the cam shaft 15, said gooves extending diametrically the one to the other (Figs. 12-14).

As coupling elements balls 18 can be employed as shown in Figs. 1 to 11 and engage in the guide grooves 19 and 19a.

Instead of balls, bolts 52 might be employed as shown in Figs. 12 and 13, the body 52' of these bolts being rotatably mounted directly in a bore of the cam body or in a bush 53 inserted in this bore. As in this instance the control grooves are produced by a circular milling cutter which corresponds approximately to the diameter of bolt 52, an accurate guiding in the control grooves is ensured thereby for coupling elements of this shape.

The coupling elements (balls or bolts) may further be inserted into a separate coupling ring 57, as shown in Figs. 12 and 14. In this instance a ring 57 is pushed onto the cam shaft 15, said ring having for instance two diametrically opposite projections 58 which are bored, the bushes 53 and the coupling bolts 52 being mounted in said bores. In Fig. 14 this arrangement is shown on the exhaust control cam A. This cam has consequently a lateral recess 59, into which fit the claw-like extensions of the coupling ring so that, when the cam shaft 15 turns, this ring rotates the cams. The coupling ring 57 need be inserted only loosely, as it is secured in its position by the spacing ring 11.

In order to facilitate the production of the parts of the cam shaft which have the control grooves, they are made as separate parts 15 connected with the central part 15a of the cam shaft by coupling flanges 44, Fig. 2. The cam shaft is rotated in any of the well known manners by a drive not illustrated.

The axial shifting of the cam shafts 15, 15a is similarly effected by mechanical arrangements of known type which are not shown as they do not form part of the invention.

During idle running of the engine all valves remain in the open position since the admission of pressure medium to the space 38 is shut off and this space has been brought into communication with the atmosphere.

I claim:

1. Valve gear for reversible, reciprocating fluid-pressure engines, especially for locomotives, comprising in combination an axially shiftable cam shaft, two admission and at least one exhaust control cam loosely mounted on said cam shaft and secured against lateral displacement, said cam shaft having in its circumference control grooves, coupling elements connected one to each of said control cams and engaging in said grooves, the pitches of the groove sections coordinated to each cam being different so that at the axial displacement of said cam shaft the individual cams are set independently through a different angle according to its function.

2. A valve gear as claimed in claim 1, in which the groove sections coordinated to the individual cams merge one into the other and form in the circumference of the cam shaft cam grooves extending in steps.

3. A valve gear as claimed in claim 1, in which the groove sections coordinated to the individual cams merge one into the other and form in the circumference of the cam shaft cam grooves extending in steps, the individual steps of the control grooves having different pitches.

4. A valve gear for reversible, reciprocating fluid-pressure engines, especially for locomotives, comprising in combination an axially shiftable cam shaft, two admission and at least one exhaust control cam loosely mounted on said cam shaft and secured against lateral displacement, intermediate members arranged between the admission cams and the spindles of the admission valves, rockers hingedly mounted on said members, arms on said rockers bearing against the two admission cams, hollow admission valve spindles, pistons shiftable in said spindles pressed against said intermediate elements to ensure reliable contact of the control elements, said cam shaft having in its circumference control grooves, coupling elements connected one to each of said control cams and engaging in said grooves, the pitches of the groove sections coordinated to each cam being different so that at the axial displacement of said cam shaft the individual cams are set independently through a different angle according to its function.

HUGO JOHANNES LENTZ.